(12) United States Patent
Scardino

(10) Patent No.: US 7,516,104 B1
(45) Date of Patent: Apr. 7, 2009

(54) METHODS OF PROVIDING SOFTWARE OVER A NETWORK AND RELATED SYSTEMS AND COMPUTER PROGRAM PRODUCTS

(75) Inventor: Patricia Scardino, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 392 days.

(21) Appl. No.: 11/238,565

(22) Filed: Sep. 29, 2005

(51) Int. Cl.
*H04K 1/00* (2006.01)
*H04L 9/00* (2006.01)

(52) U.S. Cl. .............................. 705/58; 705/50; 705/51; 705/52; 705/57

(58) Field of Classification Search .................... 705/51
See application file for complete search history.

(56) References Cited

U.S. PATENT DOCUMENTS

| | | | |
|---|---|---|---|
| 5,790,664 A * | 8/1998 | Coley et al. ................. 709/203 |
| 5,878,032 A | 3/1999 | Mirek et al. |
| 5,892,900 A | 4/1999 | Ginter et al. |
| 6,226,618 B1 | 5/2001 | Downs et al. |
| 6,253,193 B1 | 6/2001 | Ginter et al. |
| 6,389,538 B1 | 5/2002 | Gruse et al. |
| 6,578,199 B1 | 6/2003 | Tsou et al. |
| 6,735,768 B1 | 5/2004 | Tanaka |
| 6,854,112 B2 | 2/2005 | Crespo et al. |
| 7,149,721 B1 | 12/2006 | Sites et al. |
| 7,260,646 B1 | 8/2007 | Stefanik et al. |
| 7,328,434 B2 | 2/2008 | Swanson et al. |
| 7,353,281 B2 | 4/2008 | New, Jr. et al. |
| 2002/0087601 A1 | 7/2002 | Anderson et al. |
| 2002/0088000 A1 | 7/2002 | Morris |
| 2002/0104019 A1* | 8/2002 | Chatani et al. .............. 713/201 |
| 2002/0157091 A1 | 10/2002 | DeMello et al. |
| 2003/0063770 A1 | 4/2003 | Svendsen et al. |
| 2003/0063771 A1 | 4/2003 | Morris et al. |
| 2003/0126212 A1 | 7/2003 | Morris et al. |
| 2003/0135464 A1* | 7/2003 | Mourad et al. ................. 705/50 |
| 2003/0145316 A1 | 7/2003 | McKinlay et al. |
| 2003/0154168 A1* | 8/2003 | Lautenbacher ............... 705/51 |
| 2003/0161499 A1 | 8/2003 | Svendsen et al. |
| 2003/0191851 A1* | 10/2003 | Edwards ..................... 709/231 |
| 2003/0200268 A1 | 10/2003 | Morris |
| 2003/0227477 A1 | 12/2003 | Kadiwala |
| 2004/0046868 A1 | 3/2004 | Anderson et al. |
| 2004/0083474 A1 | 4/2004 | McKinlay et al. |

(Continued)

OTHER PUBLICATIONS

Bob Tedeschi, "Photo-sharing Web sties have a place for your pictures in their digital albums, alongside messages from advertisers," Jul. 26, 2004, The New York Times.

(Continued)

*Primary Examiner*—Dante Ravetti
(74) *Attorney, Agent, or Firm*—Withrow & Terranova, PLLC

(57) ABSTRACT

Providing software over a network may include receiving a redirected access over the network from a user device at a central server, and receiving an identification of a network device and/or electronic advertisement from which the user device was redirected. A download file including the software and an acquisition code may be provided wherein the acquisition code corresponds to the identification of the network device and/or electronic advertisement from which the user device was redirected. In addition, the download file including the software and the acquisition code may be transmitted over the network to the user device. Related systems and computer program products are also discussed.

17 Claims, 6 Drawing Sheets

U.S. PATENT DOCUMENTS

| | | |
|---|---|---|
| 2004/0111415 A1 | 6/2004 | Scardino et al. |
| 2004/0139172 A1 | 7/2004 | Svendsen et al. |
| 2004/0172419 A1 | 9/2004 | Morris et al. |
| 2004/0215788 A1 | 10/2004 | Morris |
| 2004/0230966 A1 | 11/2004 | Morris et al. |
| 2004/0237081 A1 | 11/2004 | Homiller |
| 2004/0237084 A1 | 11/2004 | Kurzweil et al. |
| 2005/0075895 A1* | 4/2005 | Mohsenin et al. .............. 705/1 |
| 2005/0125528 A1* | 6/2005 | Burke et al. ................ 709/223 |
| 2005/0192940 A1 | 9/2005 | Morris |

OTHER PUBLICATIONS

Picasa On-line Support, Oct. 15, 2004.

* cited by examiner

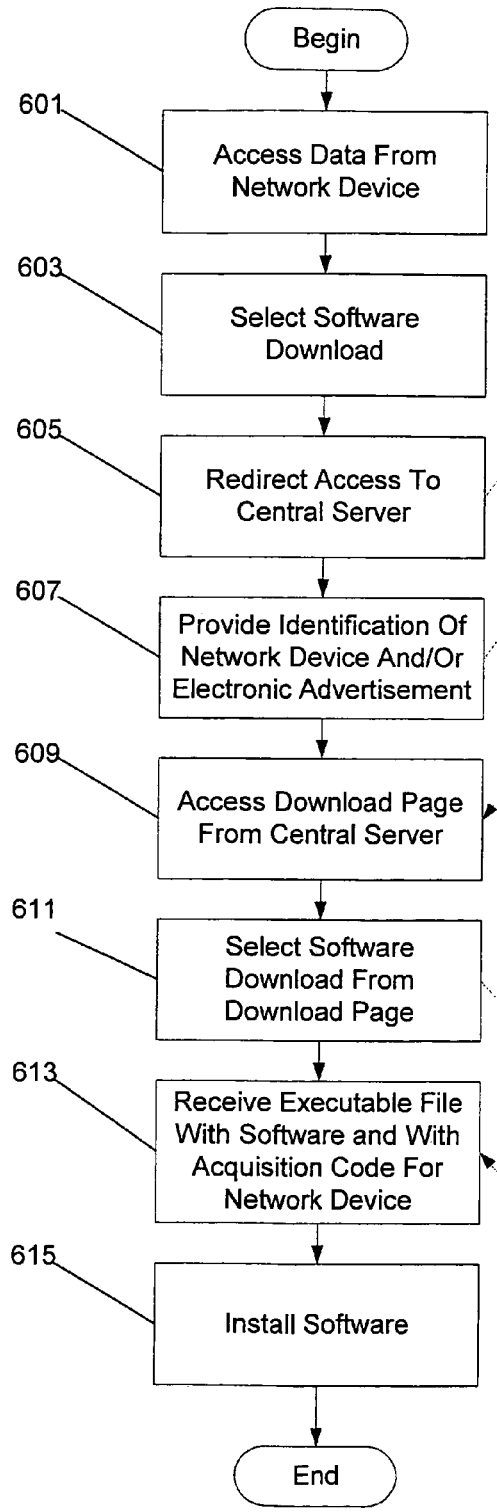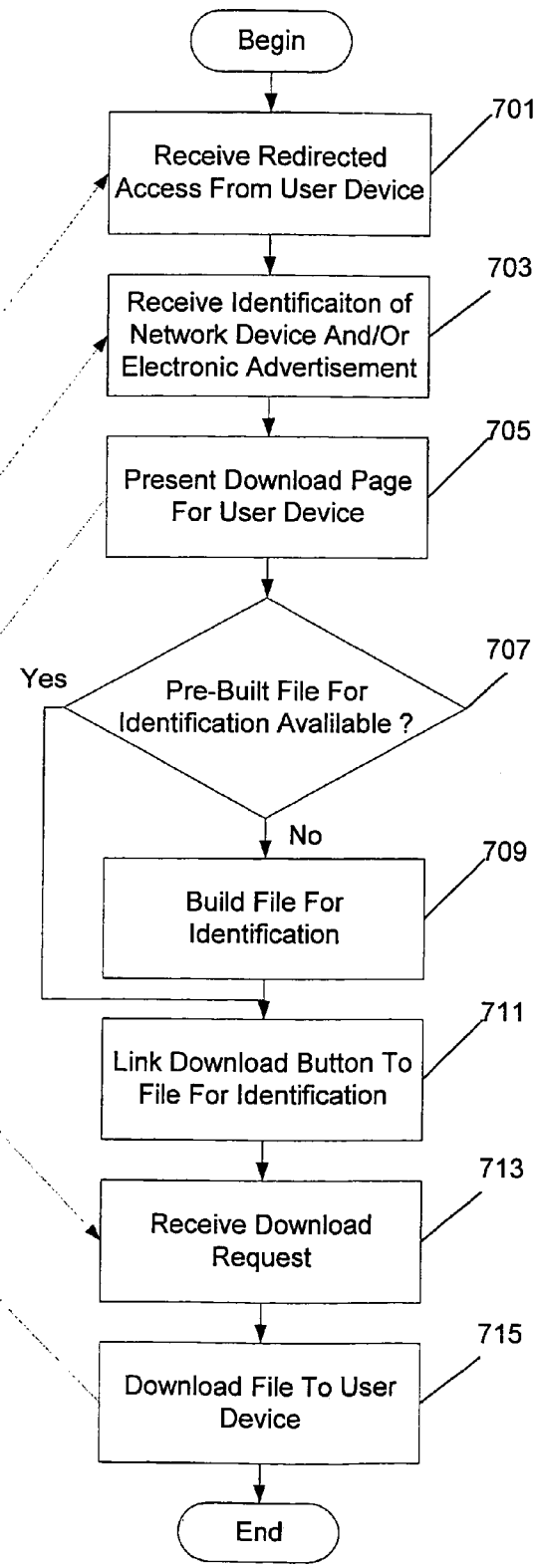

| Affiliate Code | Acquisition Code | Installation Code | Installation Time Stamp | Registration User Name | Registration Time Stamp |
|---|---|---|---|---|---|
| AFFa | ACQa | INSTa | ITSa | RUNa | RTSb |
| AFFb | ACQb | INSTb | ITSb | | |
| ... | ... | ... | ... | | |
| AFFc | ACQc | INSTc | ITSc | ... | ... |
| ... | ... | | ... | ... | ... |

Figure 8a

| Affiliate Code | Acquisition Code | Installation Code | Installation Time Stamp | Registration User Name | Registration Time Stamp |
|---|---|---|---|---|---|
| AFFa | ACQa | INSTa | ITSa | RUNa | RTSb |
| AFFb | ACQb | INSTb | ITSb | | |
| ... | ... | ... | ... | ... | ... |
| AFFc | ACQc | INSTc | ITSc | RUNc | RTSc |
| ... | ... | ... | ... | ... | ... |

Figure 8b

METHODS OF PROVIDING SOFTWARE OVER A NETWORK AND RELATED SYSTEMS AND COMPUTER PROGRAM PRODUCTS

RELATED APPLICATION

The present application is related to U.S. patent application Ser. No. 11/239,255, filed on Sep. 29, 2005, and entitled "Methods Of Tracking Remote Software Installations And Registrations And Related Systems And Computer Program Products," the disclosure of which is hereby incorporated herein in its entirety by reference.

FIELD OF THE INVENTION

The present invention relates to the field of computer software, and more particularly, to methods of installing software and related systems and computer program products.

BACKGROUND

Computers perform specific tasks by following a set of instructions commonly known as "software". A piece of software can be distributed to end-users by storing the software on removable storage media such as floppy diskettes or compact disks, and making the storage media available to the users. Typically, the storage medium includes the software to be installed and an installer. The installer is a specialized piece of software designed to assist users in the installation process. A user starts the installation process by inserting the storage medium in a storage medium reader (e.g., floppy drive, CD-ROM drive, etc.) of a computer, and then invoking the installer. In some operating systems, the installer is automatically invoked as soon as the storage medium is inserted in the reader. The installer asks the user a series of questions regarding her preferences as to file storage locations, the amount of files to install, default settings, etc. Thereafter, the installer proceeds to copy the software from the storage medium to the computer's mass storage device (e.g., hard disk drive), and performs any necessary configuration changes in accordance with the user's preferences.

Software can also be distributed by making the software available for download over a network. In that case, the software is stored on a server coupled to the network. A user who wishes to obtain the software couples a computer onto the network, and downloads the software from the server to the computer. The convenience of being able to obtain software at any time and the widespread availability of public networks such as the Internet contribute to the popularity of downloadable software.

Downloading software over a network is not without problems. On the Internet, for example, a software vendor has to somehow alert potential users that a particular piece of software is available for download. Considering the cost of advertising and the number of competing software products available on the Internet, an effective technique for informing potential users of the existence of the downloadable software, and convincing them to download the software, may be desirable. In addition, it may be desirable to track sources of downloads to determine relative effectiveness of different advertising channels.

For example, a registration form may be generated when the software is downloaded and/or installed on the user's computer, and the registration form may request information from the user. More particularly, the registration form may request entry of a referring source (e.g. an advertisement or other source) through which the user became aware of the software, and the information provided through the registration form may be returned to the server that provided the download. The use of registration forms and/or other prompts for user entry of information, however, relies on accurate user entry of the requested information. Many users, however, do not take time to complete registration forms and/or do not complete registration forms accurately.

Software downloads over a computer network are discussed, for example, in U.S. Patent Publication No. 2004/0083474 to McKinlay et al.; in U.S. Patent Publication No. 2003/0145316 to McKinlay et al.; and in U.S. Patent Publication No. 2003/0227477 to Kadiwala. The disclosures of each of the above referenced patent publications are hereby incorporated herein in their entireties by reference.

SUMMARY

According to some embodiments of the present invention, methods of tracking remote software installations at a central server may include receiving an installation message over a network from a user device wherein the installation message indicates an installation of the software at the user device. After receiving the installation message from the user device, an installation code may be created responsive to receiving the installation message, and the installation code may uniquely identify installation of the software at the user device. The installation code may be transmitted over the network to the user device, and the installation code may be stored at the central server.

In addition, receiving registration information and the installation code may be received over the network from the user device after storing the installation code, and a user name for the user device may be stored at the central server. More particularly, the registration information received from the user device may include the user name. Moreover, a first timestamp may be stored at the central server wherein the first timestamp represents a time of installation of the software at the user device, and a second timestamp may be stored at the central server wherein the second timestamp represents a time of registration of the software at the user device.

A delay between installation and registration of the software at the user device may thus be calculated using the first and second timestamps. In addition, an acquisition code may be stored at the central server with the installation code wherein the acquisition code identifies a source of the software at the user device, and the source of the software at the user device may be associated with the delay between installation and registration of the software at the user device using the acquisition code. More particularly, the installation message may include the acquisition code.

After storing the user name for the user device, a request may be received over the network from the user device to print at least one digital image, and/or sharing of files from the user device over the network may be coordinated. The installation message may include an acquisition code defining a source of the software, and the acquisition code may be stored with the installation code. The installation message may also include an affiliate code defining pricing for services provided by the central server for the user device, and the affiliate code may be stored with the installation code. In addition, a file including the software may be transmitted over the network to the user device before receiving the installation message.

According to some additional embodiments of the present invention, methods of installing software at a user device may include receiving the software at the user device, and storing the software at the user device. An installation message may be transmitted over a network to a central server wherein the installation message indicates installation of the software at the user device. After transmitting the installation message, an installation code may be received from the central server over the network wherein the installation code uniquely identifies installation of the software at the user device, and the installation code may be stored at the user device.

After storing the installation code in memory at the user device, user input of registration information may be accepted at the user device, and the registration information and the installation code may be transmitted over the network to the central server. Moreover, the registration information may include a user name for services provided by the central server using the software at the user device.

Digital image files may be organized at the user device using the software before or after transmitting the registration information. After transmitting the registration information, at least one of the digital image files may be shared over the network using the software, and/or a request may be transmitted over the network to print at least one of the digital image files using the software.

Receiving the software may also include receiving an acquisition code defining a source of the software, and the installation message may include the acquisition code. Receiving the software may further include receiving an affiliate code defining pricing for services provided by the central server for the user device using the software, and the installation message may include the affiliate code. Moreover, receiving the software at the user device may include receiving the software on a physical storage medium at the user device and/or receiving the software as a download over the network.

According to some more embodiments of the present invention, methods of providing software over a network may include receiving a redirected access over the network from a user device at a central server, and receiving an identification of a network device and/or electronic advertisement from which the user device was redirected. A download file including the software and an acquisition code may be provided wherein the acquisition code corresponds to the identification of the network device and/or electronic advertisement from which the user device was redirected. The download file including the software and the acquisition code may be transmitted over the network to the user device.

In addition, a download page may be presented to the user device over the network, a download button of the download page may be linked to the download file including the software and the acquisition code, and a download request from the user device may be received using the download button of the download page over the network. Accordingly, transmitting the download file may include transmitting the download file responsive to receiving the download request.

Providing the download file may include selecting the download file including the acquisition code and the software from a plurality of download files including the software and respective different acquisition codes. In an alternative embodiment, providing the download file may include creating the download file including the acquisition code and the software responsive to receiving the identification of the network device and/or electronic advertisement from which the user device was redirected.

Moreover, receiving the identification of the network device and/or electronic advertisement may include extracting the identification of the network device and/or electronic advertisement from a uniform resource locater (URL) for the redirected access. The software may support editing and/or organizing digital image files at the user device, and/or the software may support sharing of digital image files at the user device over the network.

After transmitting the download file, an installation message may be received over the network from the user device, and the installation message may indicate installation of the software at the user device. After receiving the installation message from the user device, an installation code may be created that uniquely identifies installation of the software at the user device. The installation code may then be transmitted to the user device, and the installation code may be stored at the central server. After storing the installation code, registration information and the installation code may be received over the network from the user device, and a user name for the user device may be stored at the central server. After storing the user name, sharing of files at the user device over the network may be coordinated and/or a request may be received from the user device to print at least one digital image from the user device.

According to still more embodiments of the present invention, computer program products may be provided for tracking remote software installations at a central server, and the computer program products may include a computer readable medium having computer readable program code embodied therein. More particularly, the computer readable program code may include computer readable program code configured to receive an installation message over a network from a user device wherein the installation message indicates an installation of the software at the user device. Computer readable program code may also be configured to create an installation code responsive to receiving the installation message from the user device, wherein the installation code uniquely identifies installation of the software at the user device. In addition, computer readable program code may be configured to transmit the installation code over the network to the user device and to store the installation code at the central server.

According to yet more embodiments of the present invention, computer program products may be provided for installing software at a user device, and the computer program products may include a computer readable medium having computer readable program code embodied therein. More particularly, the computer readable program code may include computer readable program code configured to receive the software at the user device and to store the software at the user device. Computer readable program code may be configured to transmit an installation message over a network to a central server wherein the installation message indicates installation of the software at the user device. Computer readable program code may also be configured to receive an installation code from the central server over the network after transmitting the installation message, wherein the installation code uniquely identifies installation of the software at the user device. In addition, computer readable program code may be configured to store the installation code at the user device.

According to additional embodiments of the present invention, computer program products may provide software over a network, and the computer program products may include a computer readable medium having computer readable program code embodied therein. The computer readable program code may include computer readable program code configured to receive a redirected access over the network from a user device at a central server, and to receive an identification of a network device and/or electronic advertisement from which the user device was redirected. Computer readable program code may also be configured to provide a download file including the software and an acquisition code, wherein the acquisition code corresponds to the identification of the network device and/or electronic advertisement from which the user device was redirected. In addition, computer readable program code may be configured to transmit the download file including the software and the acquisition code over the network to the user device.

BRIEF DESCRIPTION OF THE DRAWINGS

FIGS. 2-7 are flow charts illustrating operations of software installations, registrations, and downloads according to embodiments of the present invention.

FIGS. 8a and 8b are tables illustrating storing of installation and registration information according to embodiments of the present invention.

DETAILED DESCRIPTION

Figure 1:
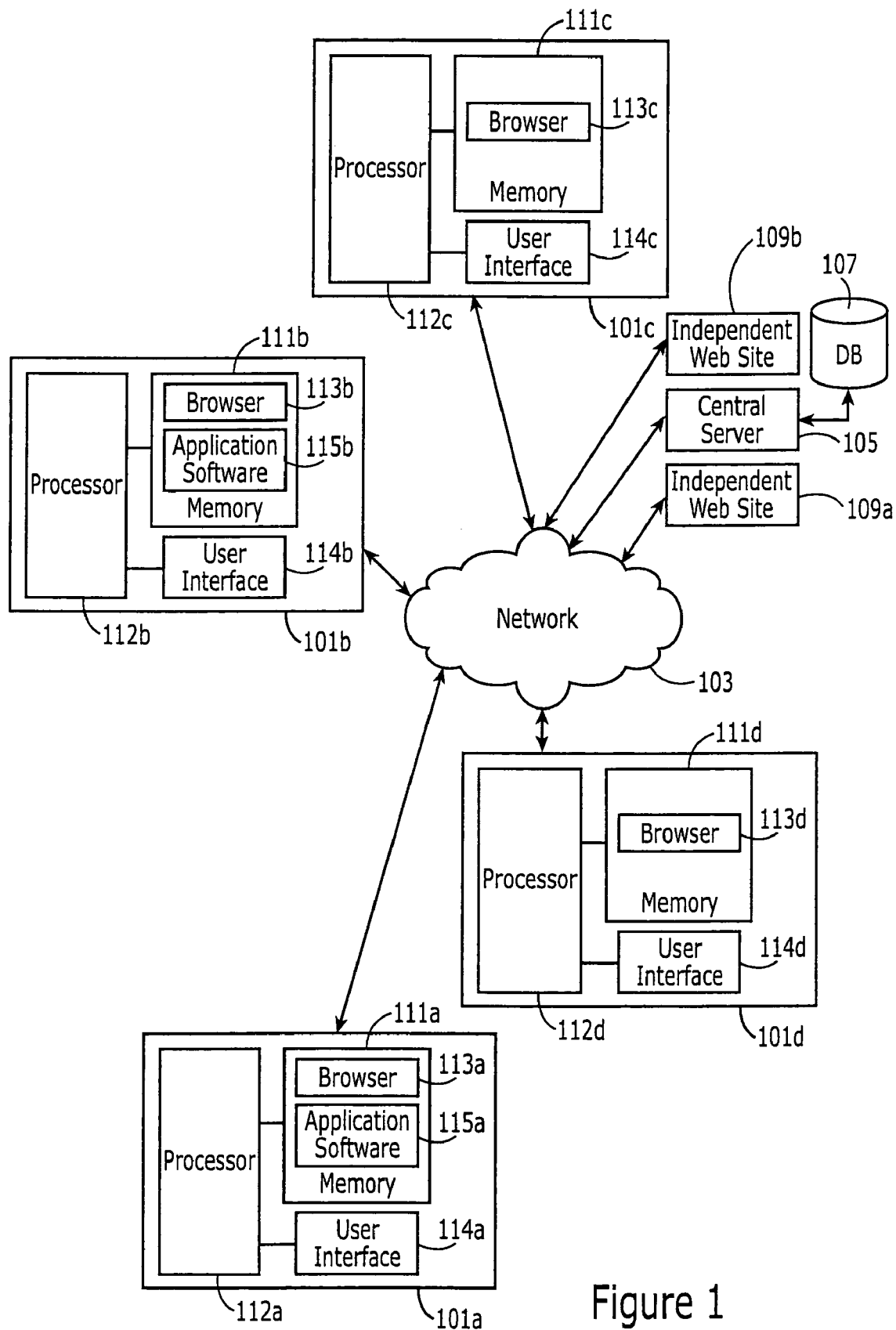
FIG. 1 is a block diagram illustrating network devices coupled through a network according to embodiments of the present invention.

The present invention now will be described more fully hereinafter with reference to the accompanying drawings, in which illustrated embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first multimedia device could be termed a second multimedia device, and, similarly, a second multimedia device could be termed a first multimedia device without departing from the teachings of the disclosure.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described herein with reference to flowchart and/or block diagram illustrations of methods, systems, and devices in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computing device (such as a computer or other programmable data processing apparatus) to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to embodiments of the present invention, peer-to-peer file sharing may be provided between user devices 101a-d (such as personal computers, laptop computers, hand-held computers, personal digital assistants, etc.) over a network 103 (such as the Internet). More particularly, application software 115a-b may be provided at peer user devices 101a-b allowing the peer user devices 101a-b to share files with other peer user devices 101a-b and non-peer user devices 101c-d including respective network browsers 113a-d. Moreover, file sharing between user devices 101a-d may be coordinated by a central server 105, and a database(s) 107 coupled to the central server may be used to track information relating to the peer user devices 101a-b including the peer-to-peer file sharing application software 115a-b.

As shown in FIG. 1, each of the user devices 101a-d includes a respective processor 112 (112a-d) that communicates with a memory 111 (111a-d) and a user interface 114 (114a-d). The user interface 114 may include a keyboard or keypad, a display, a speaker, a microphone, a joy stick, a mouse, and/or other input/output device(s). Moreover, an input/output (I/O) data port may be included in the processor 112 to provide transfer of information between the user device 101 and the network 103 and/or another user device. These components may be conventional components, such as those used in conventional data processing systems, which may be configured to operate as described herein.

Moreover, the processor 112 may communicate with the memory 111 via an address/data bus. The processor 112 can be any commercially available or custom processor, such as a microprocessor. The memory 111 is representative of the overall hierarchy of memory devices including the software and data used to implement the functionality of the user device 101. The memory 111 may include, but is not limited to, the following types of memory devices: disk, cache, ROM, PROM, EPROM, EEPROM, flash memory, SRAM, and/or DRAM.

The memory 111 may include several categories of software and data used in the user device 101: an operating system, application programs, input/output (I/O) device drivers, and data. As will be understood by those of skill in the art, the operating system may be any operating system suitable for use with a data processing system, such as AIX, or System 390 from International Business Machines Corporation; Windows 95, Windows 98, Windows 2000, or Windows XP from Microsoft Corporation; Mac OS X from Apple Computer, Inc.; Unix; or Linux. I/O device drivers typically include software routines accessed through the operating system by application programs to communicate with devices such as I/O data ports and/or memory components. Application programs, for example, may include a browser 113 used to access information over the network 103 and/or application software 115 used to organize digital image files, edit digital image files, share digital image files over the network 103, and/or request prints of digital images from the central server 105. In addition, a data portion of the memory 111 may include static and dynamic data used by application programs, the operating system, I/O device drivers, and other software programs that may reside in the memory 111.

As shown in FIG. 1, application software 115a-b (used to organize digital image files, edit digital image files, share digital image files over the network 103, and/or request prints of digital images from the central server 105) may be installed in memories 111a-b of user devices 101a-b. The application software 115, however, may not be initially installed at user devices 101c-d. Embodiments of the present invention will now be discussed with respect to the installation of the applications software 115 at the user device 101c. While embodiments of the present invention are discussed by way of example with respect to application software used for digital image files; downloads, installations, and/or registrations may be implemented using other types of application software according to other embodiments of the present invention.

According to some embodiments of the present invention, the application software 115a-b may be used to share digital images with other user devices. An album of digital images, for example, may be stored in memory 111a of user device 101a including the application software 115a, and other user devices 101b-d may access the album of digital images using the respective browser 113b-d under coordination of the central server 105 and the application software 115a. Methods and systems of sharing images over a network are discussed for example, in U.S. Patent Publication No. 2004/0139172 entitled Method And System For Requesting Image Prints In An Online Photosharing System; U.S. Patent Publication No. 2004/0111415 entitled Automatic Organization Of Images Uploaded To A Photo-Sharing Site; U.S. Patent Publication No. 2003/0200268 entitled Method And System For Sharing Digital Images Over A Network, U.S. Patent Publication No. 2003/0161499 entitled Automated Discovery, Assignment, And Submission Of Image Metadata To A Network-Based Photosharing Service; U.S. Patent Publication No. 2003/0126212 entitled Specifying, Assigning, And Maintaining User Defined Metadata In A Network-Based Photosharing; U.S. Patent Publication No. 2003/0063771 entitled Network-Based Photosharing Architecture For Searching And Delivery OfPrivate Images And Metadata, and U.S. Patent Publication No. 2003/0063770 entitled Network-Based Photosharing Architecture. The disclosures of each of the above referenced patent publications are hereby incorporated herein in their entireties by reference.

Accordingly, the application software 115a-b may be provided to and installed at each user device 101a-b from which files are to be shared. The application software 115a-b may be provided together with an installer at each user device 101a-b, for example, using an optical or magnetic disk, or using a download from the central server 105 over the network 103. Once the application software 115a-b and the installer are provided at each user device 101a-b, the installer can be used to install the application software 115a-b in memory at each user device 101a-b.

Moreover, use of the application software at a user device may be registered with the central server 105 to allow file sharing and/or other services (such as photo-printing) provided by the central server 105. In addition, information from application software registrations may be saved in database 107. For example, the user device 101a may install the application software 115a, and the application software 115a may be used at the user device 101a, for example, to edit and/or organize files (such as digital image files) without registering with the central server 105. Additional functionality and/or services (such as file sharing and/or photo-printing) may be provided using the application software 115a after registering with the central server 105.

The application software and/or services offered in connection with the central server 105 may be advertised and/or marketed through different channels to encourage downloading and/or use thereof. There may thus be a desire to separately track an effectiveness of the different advertising and/or marketing channels. For example, the registration process may request that the user enter the source through which the user became aware of the software. The reliability of information entered by user, however, is dependent on accuracy of the user input, so that user registrations may not provide accurate information regarding the effectiveness of different advertising and/or marketing sources.

A user of user device 101c may become aware of the application software 115 through an on-line advertisement provided on an independent website 109a or 109b, and/or through an advertisement provided when sharing files provided by user device 101a and/or 101b using the application software 115a and/or 115b. A button in such an on-line advertisement may redirect the browser 113c to the central server 105 to facilitate downloading the application software and installer. In an alternative embodiment, the application software and installer may be provided at the user device 101c on an optical and/or magnetic disk. According to embodiments of the present invention, the application software and the installer may be provided together with an acquisition code that identifies a source of the software, and an installation code may be assigned by the central server 105 to the user device 101c when installing the application software. For example, a first acquisition code may be provided with application software distributed via download responsive to a redirection from an on-line advertisement at independent website 109a; a second acquisition code may be provided with application software distributed via download responsive to a redirection from an on-line advertisement at independent website 109b; a third acquisition code may be provided with application software distributed via download responsive to a redirection from the peer user device 101a; a fourth acquisition code may be provided with application software distributed via download responsive to a redirection from the peer user device 101b; a fifth acquisition code may be provided with application software distributed via an optical and/or magnetic disk from a first provider; and a sixth acquisition code may be provided with application software distributed via an optical and/or magnetic disk from a second provider.

In addition to the acquisition code, an affiliate code may also be provided with the application software and the installer, and different affiliate codes may identify different pricing structures for services provided by the central server 105. An affiliate code, for example, may define pricing for a particular user device, may define which advertisements (such as banner advertisements) are provided at the user device home page for the application software, and/or discounts that may be available for the particular user. In other alternatives, separate acquisition and affiliate codes may not be required.

While the central server 105 and the database 107 are shown as separate entities, the two elements and/or components thereof may be implemented together. Moreover, functionalities of the central server 105 may be provided at one location or provided using two or more separate components. In addition, the database 107 may be considered as a component of the central server 105.

Figure 2:
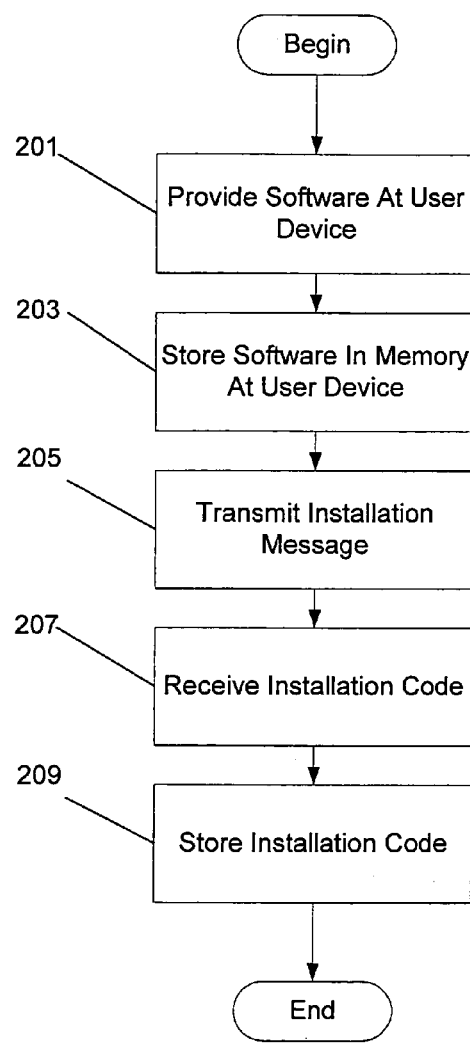
Figure 3:
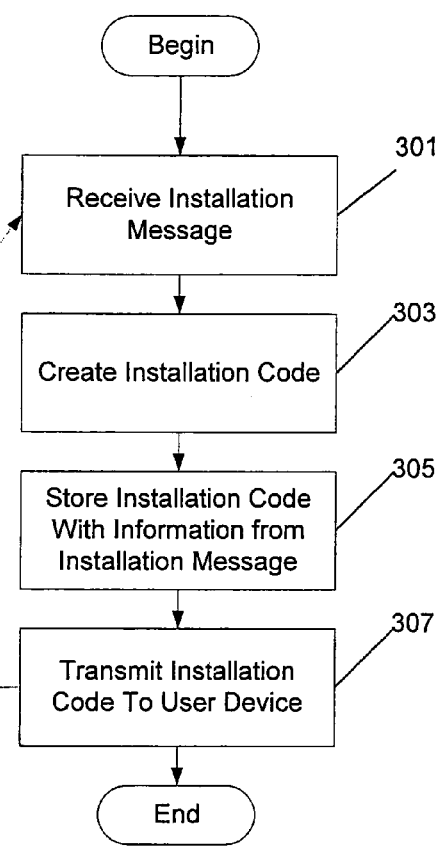

Operations of providing, installing, and registering the application software at the user device 101c will now be discussed with respect to the flow charts of FIGS. 2-7. According to first embodiments of the present invention, operations of the user device 101c are illustrated in FIG. 2 (at blocks 201-209) and operations of the central server 105 are illustrated in FIG. 3 (at blocks 301-309) while installing the application software at the user device 101c. At block 201, the application software and an installer may be provided at the user device 101c. As discussed above, the application software and the installer may be provided as a download from the central server 105 over the network 103 or with an optical or magnetic disk or other physical medium. In addition, an acquisition code and/or an affiliate code may be provided with the application software and the installer. As discussed above, an acquisition code is a code used to identify a source of the software, and an affiliate code is a code used to identify a pricing structure to be applied when using the software.

At block 203, the installer may be executed to store the application software in the memory 111c of the user device 101c. At block 205 of FIG. 2, an installation message may be transmitted by the user device 101c over the network 103, and the installation message may be received by the central server 105 at block 301 of FIG. 3. While block 205 is shown after block 203, the operations of storing the application software and transmitting the installation message may be performed concurrently or the order may be reversed. In addition, the installation message may include the acquisition code and/or the affiliate code that were provided with the application software. The installation message is used to notify the central server 105 of installation of the software application at the user device 101c. In other words, the installation message provides indication to the central server 105 that the application software is installed at the user device 101c.

At block 303 of FIG. 3, the central server 105 creates an installation code responsive to receiving the installation message from the user device 101c, and the installation code uniquely identifies installation of the application software at the user device 101c. In other words, a different installation code may be generated by the central server 105 for each installation message received at the central server 105 so that a different installation code is created each time an installation message for the application software is received. The central server 105 may then store the installation code with information from the installation message in the database 107 at block 305.

More particularly, the database 107 may be used to store a table of information relating to installations and registrations of the application software at different user devices 101. An example of a table of installation/registration information for the application software is shown in FIG. 8a. Each row in the table of FIG. 8a includes information for the installation/registration of the application software at a particular user device, and a new row may be added each time a new installation message is received at the central server 107. Accordingly, the acquisition code (labeled ACQc) and the affiliate code (labeled AFFc) received with the installation message at block 301 and the installation code (labeled INSTc) created at block 303 may be stored in the respective columns of the table of FIG. 8a in a same row at block 305. In addition, an installation timestamp (labeled ITSc) may be stored with the installation code to reflect a time that the application software is installed at the user device 101c. For example, the timestamp may indicate a time that the installation message is received at the central server 105 at block 301, a time that the installation message is transmitted by the user device 101c, a time that the installation is initiated, a time that the installation code is created, etc.

As shown in FIG. 8a, a new row may be generated in the table of FIG. 8a responsive to receiving the installation message from the user device 101c. Moreover, the table may already be populated with information relating to the prior installation of the application software at other user devices. As discussed above, each installation code (INSTa, INSTb, INSTc) in FIG. 8a will be unique for each installation of the application software. Affiliate codes (AFFa, AFFb, and/or AFFc) and acquisition codes (ACQa, ACQb, and/or ACQc) from different installation messages, however, may be the same or different. For example, different installation messages may have the same acquisition code and different affiliate codes indicating that the software was obtained from the same source but with different pricing structures. Moreover, different installation messages may have different acquisition codes and the same affiliate code indicating that the software was obtained from different sources but with the same pricing structures.

When the installation code INSTc is initially stored in the table of FIG. 8a for the user device 101c at block 305, the fields for the registration user name and registration timestamp may remain blank for the user device 101c as shown in FIG. 8a. Moreover, the fields for the registration user name and registration timestamp may remain blank for the user device 101c until the application software at the user device 101c is registered with the central server 105. In the example of FIG. 8a, the row of information including AFFa, ACQa, INSTa, ITSa, RUNa, and RTSa may represent installation and registration information for the application software that has been both installed at user device 101a and registered with the central server 105. Moreover, the row of information including AFFb, ACQb, INSTb, and ITSb may represent installation information for the application software that has been installed at user device 101b but not yet registered with the central server 105.

At block 307, the installation code INSTc may be transmitted back to the user device 101c, and the installation code INSTc may be received at the user device 101c at block 207. The installation code INSTc may then be stored at the user device 101c at block 209 for use when the application software at the user device 101c is registered with the central server 105. While transmitting the installation code at block 307 is shown after storing the installation code at block 305, it will be understood that the order of the these operations may be reversed, or the operations may be performed simultaneously.

Figure 4:
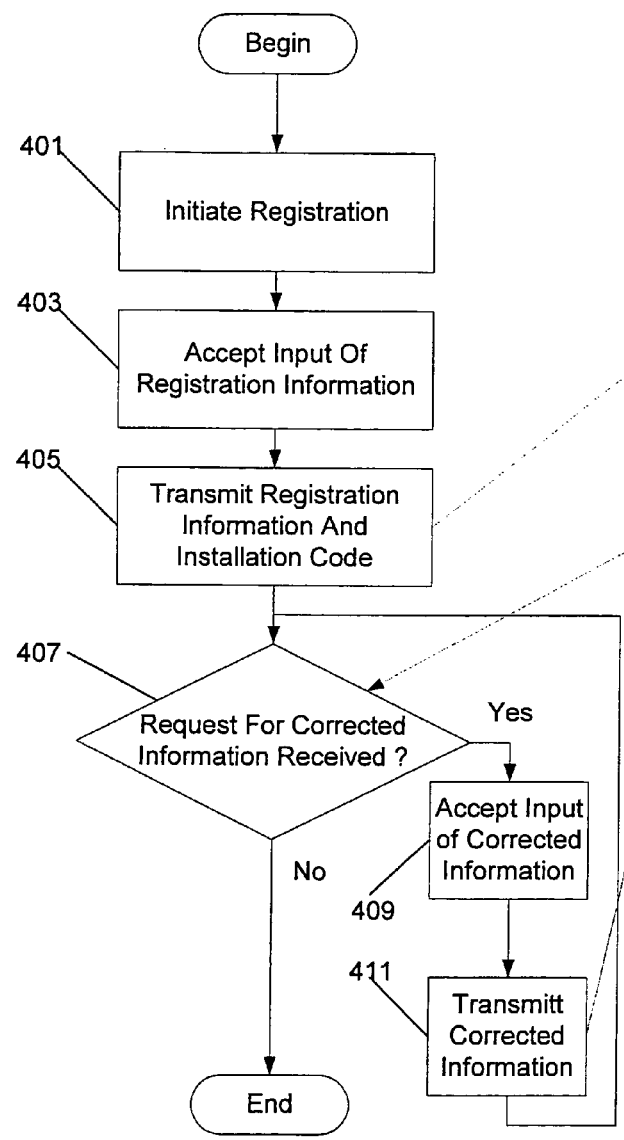
Figure 5:
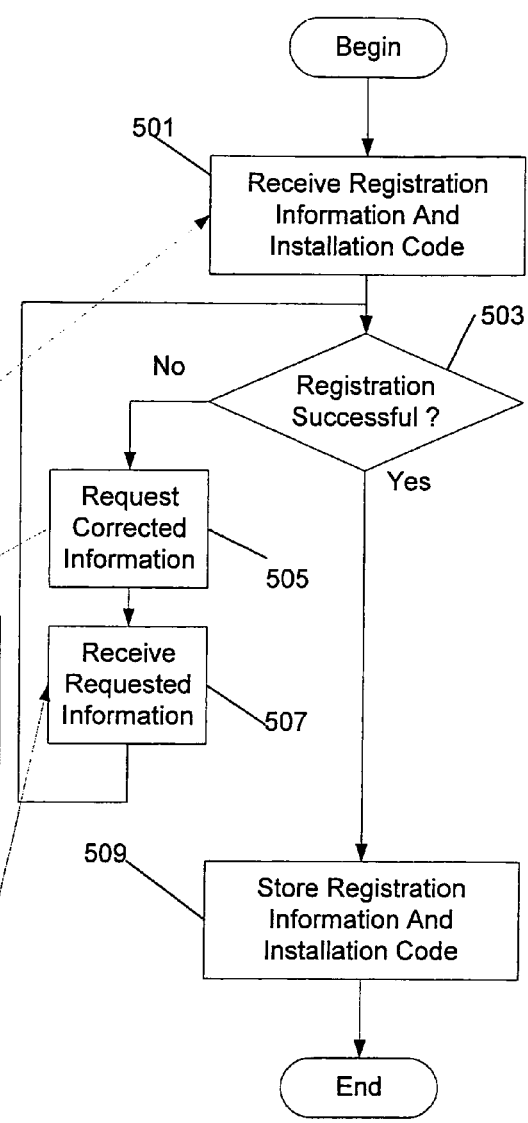

According to second embodiments of the present invention, operations of the user device 101c are illustrated in FIG. 4 (at blocks 401-411) and operations of the central server 105 are illustrated in FIG. 5 (at blocks 501-509) while registering use of the application software at the user device 101c with the central server 105. As discussed above with respect to FIGS. 2 and 3, the application software may be installed at the user device 101c without registering installation with the central server. Without registration with the central server, for example, the user device 101c may use the application software to edit and/or organize files (such as digital image files). By registering the application software with the central server 105, files from the user device 101c may be shared with other user devices and/or processing (such as photo-processing) and/or other services may be provided by the central server 105.

At block 401 of FIG. 4, registration may be initiated at the user device 101c. The application software, for example, may prompt the user to initiate registration each time the application software is used at the user device 101c until registration occurs. In addition or in an alternative, the application software may prompt the user to initiate registration as a part of installation. In yet another alternative, the user may initiate registration of the application software without prompting.

At block 403 of FIG. 4, the user device 101c may accept input of registration information from the user. Once registration has been initiated, a form may be displayed prompting for user input of the registration information. Registration information, for example, may include a user name and password selected by the user that will be used when obtaining service from central server 105.

At block 405, the registration information and the installation code INSTc may be transmitted from the user device 101c to the central server 105, and the registration information and the installation code INSTc may be received by the central server 105 at block 501 of FIG. 5. The registration information may be processed, and if the registration is successful at block 503, the registration information may be stored at block 509. If the registration is not successful at block 503, the central server 105 may transmit a request for corrected registration information at block 505.

At block 503, for example, the central server 105 may check if the user selected user name is unique (i.e., the user name has not already been assigned to another user). If the user has not selected a unique user name and/or if the selected user name does not conform to a prescribed format (e.g., it is too long or too short), the central server 105 may transmit a request for another user name at block 505. In addition or in an alternative embodiment, the user may be required to enter the same password twice, and if the password is not correctly entered two times or if the password does not conform to a prescribed format, the central server 105 may transmit a request to reenter the password at block 505. Moreover, the user may be required to enter a credit/debit card number, and if the credit/debit card number is not approved, the central server may transmit a request to enter a new credit/debit card number. In addition, the central server 105 may transmit a request for corrected information at block 505 if required registration information is not provided.

If a request for corrected information is received at block 407, the user of user device 101c may be prompted to input corrected information, and the corrected information may be accepted at block 409. The corrected information may then be transmitted from the user device 101c at block 411 and received by the central server 105 at block 507. Once the correct registration information has been received at the central server 105 and the registration is successful at block 503, the registration information may be stored at block 509. In addition, a confirmation of registration may be transmitted from the central server 105 to the user device 101c indicating successful completion of the registration process and/or acceptance of the registration information provided from the user device 101c.

More particularly, the installation code INSTc received with the registration information at block 501 may be used to match the registration information with the installation information previously entered in the table of FIG. 8a and discussed above with respect to FIGS. 2 and 3. As shown in the table of FIG. 8b, the central server 105 may complete the row of information for the installation and registration of the application software at the user device 101c in the database 107.

While the tables of FIGS. 8a and 8b show an arrangement of information in rows and columns for ease of illustration, it will be understood that the information may be stored in the database 107 in any format that may be convenient. The database 107, for example, may be a relational database and each row of information may represent a record for a respective user device. Moreover, each record may have a unique installation code (i.e., no two records for the same application software have the same installation code) so that the installation code may be used to match registration information with an existing record including installation information for the same user device.

As discussed above, at block 403, the user device 101c may accept entry of a user selected user name RUNc (also referred to as a Registration User name), the user selected user name RUNc may be transmitted from the user device 101c at block 405 with the installation code INSTc, and the user selected user name RUNc may be received with the installation code INSTc at block 501. The central server 105 may then use the installation code INSTc to locate the installation information (for example, including AFFc, ACQc, and INSTc previously saved in the table of FIG. 8a) associated with the prior installation of the application software at the user device 101c.

As shown in FIG. 8b, the table of FIG. 8a may be updated to include the user selected user name RUNc for the user device 101c and the registration time stamp RTSc indicating a time of registering the application software at the user device 101c. The registration time stamp RTSc, for example, may reflect a time that the registration information from the user device 101c is received at the central server 105 at block 501, a time that the registration information is transmitted by the user device 101c, a time that the registration is initiated, a time that the registration information is stored, etc.

In other embodiments of the present invention, a user name and/or password may be assigned by the central server 105 responsive to registration information received from the user device 101c. Accordingly, successful registration at the central server 105 may be followed by transmission of the user name and/or password to the user device 101c, and the user device 101c may store the user name and/or password received from the central server 105.

Once the application software has been installed at user device 101c and registered with the central server 105, the central server 105 can access the acquisition code ACQc identifying a source of the application software for the user device 101c, the installation timestamp ITSc identifying a time the application software was installed at the user device 101c, and the registration timestamp RTSc identifying a time the application software for the user device 101c was registered with the central server 105. Accordingly, the central server 105 can determine a delay between installation and registration at the user device 101c (i.e., the delay between ITSc and RTSc), and the delay can be correlated with the source of the software as identified by the acquisition code. Moreover, the installation and registration information for a plurality of user devices can be analyzed to determine which advertising and/or marketing sources are most effective in terms of resulting numbers of downloads, and/or which advertising and/or marketing sources result in the longest and/or shortest delays between installation and registration. This information can thus be used to dynamically track marketing experiments and/or results. Moreover, information relating to installations can be tracked separately and/or independently from information relating to registrations. For example, a number of installations and a number of registrations resulting from a particular advertising and/or marketing source may be determined.

According to some embodiments of the present invention, the user device 101c may be registered with the central server 105 before installing the application software. More particularly, the user device 101c may be registered with the central server 105 to allow purchasing of prints of files shared by user devices 101a and/or 101b. As discussed above, the user device 101c can access files shared by other user devices using browser 113c without installing the application software. Accordingly, the previously assigned user name and password for the user device 101c can be obtained by the central server 105 when the user device 101c registers the application software as discussed above with respect to FIGS. 4 and 5, and the previously assigned user name and password may be stored with the registration information at block 509.

According to some additional embodiments of the present invention, the application software may be installed at the user device 101c without receiving an installation code. For example, tracking operations of the central server 105 may be implemented after installing the application software at the user device 101c but before registering the application software at the user device 101c. During the registration process of FIGS. 4 and 5, an installation code may not be provided and information relating to the previous installation of the software at user device 101c may not be available at the central server 105. Accordingly, a new row of information for the user device 101c may be generated by the central server 105 during registration. Moreover, both the installation timestamp INTSc and the registration timestamp RTSb may be set to indicate the time of registration, and the acquisition code ACQc may be set to "OLD" to indicate that the software was installed at user device 101c before tracking for installation timestamps was recorded.

According to some other embodiments of the present invention, the user device 101c may have installed an old version of the application software, and an upgrade of the application software may be requested. In this case, installation information for the user device 101c may not have been previously saved in the table of FIG. 8b so that a new row of information for the user device 101c may be created by the central server 105 when the application software upgrade is requested. In this case, a new installation code may be created at the time of the upgrade; the affiliate code may be obtained from the user device 101c and the acquisition code ACQc may be set to "UPGRADE" to indicate that the software was installed at user device 101c before tracking for installation timestamps was recorded; and the installation timestamp ITSc may be stored to reflect the time of the upgrade.

As discussed above with respect to block 201 of FIG. 2, the application software and installer may be provided at the user device 101c on an optical and/or magnetic disk and/or other physical medium. Moreover, appropriate affiliate and/or acquisition codes may be provided with the application software and installer on the physical medium. Accordingly, application software distributed on a physical medium by a first retailer may be provided with a first acquisition code identifying the first retailer, and application software distributed on a physical medium by a second retailer may be provided with a second acquisition code identifying the second retailer. Affiliate codes for application software distributed on a physical medium by a same retailer may change to reflect changes in pricing over time, to reflect different pricing for different purchases, to reflect temporary discounts, etc. Application software for digital image editing, organization, file sharing, and/or photo-processing, for example, may be provided on an optical disk with the purchase of a digital camera.

In an alternative embodiment, the application software and installer may be provided at the user device 101c by a download from the central server 105 over the network 103 (such as the Internet). More particularly, the user device 101c may be redirected from an electronic advertisement for the application software provided on-line over the network 103 to the central server 105 to initiate the download. In this case, the central server may need to provide the appropriate acquisition code with the application software and installer during the download. Operations of downloading application software according to embodiments of the present invention will be discussed with reference to FIGS. 6 and 7.

At block 601 of FIG. 6, the user device 101c may access data over the network 103 from another network device such as website 109a, website 109b, user device 101a, and/or user device 101b. The user device 101c may access a webpage from website 109a using browser 113c, and an electronic banner advertisement for the application may be provided by the website 109a. In an alternative, the user device 101c may use browser 113c to access digital images made available at user device 101a via application software 115a and/or central server 105. While accessing the digital images from user device 101a, the application software 115a and/or central server 105 may present an electronic advertisement for the application software to the user device 101c. In either case, the electronic advertisement may provide a graphical-user-interface (GUI) button at the user device 101c to select a download of the application software to the user device 101c.

At block 603, a download of the application software may be selected using the GUI button presented by the electronic advertisement at the user device 101c. In response to selecting download of the application software, the user device 101c may be redirected to the central server 105 at block 605, and the redirected access from the user device 101c may be received by the central server at block 701. At block 607, the user device 101c may transmit an identification of the network device and/or electronic advertisement from which the user device 101c is being redirected, and the identification of the network device and/or electronic advertisement may be received by the central server at block 703. While operations of blocks 605 and 607 are shown separately, operations of blocks 605 and 607 may be performed at the same time or the order may be reversed. Similarly, operations of blocks 701 and 703 may be performed at the same time or the order may be reversed.

If the user device 101c is redirected from access to user device 101a, an identification of the user device 101a may be received by the central server 105 at block 703. If the user device 101c is redirected from an electronic advertisement at website 109a, an identification of the website 109a and/or the electronic advertisement may be received by the central server 105 at block 703. The central server 105 may thus be able to determine the source of a request for a download without requiring user identification of the source. For example, when the user device 101c is redirected from another network device to the central server 105, a portion of the URL (Uniform Resource Locator) may include an identification of the network device from which the user device 101c has been redirected as a passed-in parameter and/or a referrer link.

At block 705, the central server 105 may present a download page for the user device 101c, and the user device may access the download page from the central server 105 at block 609. The central server 105 may then determine if an application software file including an appropriate acquisition code is available for the network device and/or electronic advertisement identified as the source of the redirection. If a pre-built application software file including the appropriate acquisition code is available at block 707, the central server may link the available pre-built application software file to a download button of the download page presented for the user device at block 711. If a pre-built application software file including the appropriate acquisition code is not available at block 707, the central server 105 may build an application software file including the appropriate acquisition code on the fly at block 709, and the central server may link the built application software file to a GUI download button of the download page presented for the user device 711. Each application software file may thus include the application software, the installer, and an acquisition code corresponding to the identification received at block 703.

More particularly, the central server 105 may have access to a library of pre-built application software files including the same application software and the same installer, but including different acquisition codes corresponding to different identifications of network devices and/or electronic advertisements. Accordingly, the central server 105 may check the library of pre-built application software files at block 707 before building a new application software file at block 709. Moreover, a selection of pre-built application software files for the library may be determined based on frequency of use. In other words, more frequently used application software files may be included in the library, while less frequently used application software files may not be included in the library. Once a particular application software file has been downloaded a predetermined number of times over some period of time, the application software file may be added to the library. If an application software file in the library has not been downloaded a sufficient number of times over some period of time, the application software file may be removed from the library.

At block 611, the user device 101c may accept selection of the GUI download button of the download page from the central server 105 so that a download request for the application software file is transmitted from the user device 101c and received by the central server 105 at block 713. Responsive to receiving the download request, the central server 105 may download the application software file at block 715. At block 613, the user device 101c may receive the downloaded application software file including the application software, the installer, and the acquisition code. The application software may then be installed by the user device 101c at block 615. Operations of installation are discussed in greater detail above with respect to FIGS. 2 and 3.

As discussed above, the acquisition code corresponds to the identification of the network device and/or electronic advertisement from which the user device was redirected at block 605 to initiate the download. Accordingly, the source of the download can be identified using the acquisition code during subsequent installation and/or registration operations as discussed above with respect to FIGS. 2-5. Moreover, the identification of the network device and/or electronic advertisement may be translated by the central server 105 into the appropriate acquisition code different than the identification. In an alternative embodiment, the identification of the network device and/or the electronic advertisement may be the same as the corresponding acquisition code so that no translation is required.

In the drawings and specification, there have been disclosed exemplary embodiments of the invention. However, many variations and modifications can be made to these embodiments without substantially departing from the principles of the present invention. All such variations and modifications are intended to be included herein within the scope of the present invention, as set forth in the following claims. While embodiments of the present invention have been discussed above with respect to peer-to-peer file sharing software applications, for example, it will be understood that providing, tracking, and/or installing software according to embodiments of the present invention may be provided for other types of application software.

That which is claimed is:

1. A method of providing software over a network, the method comprising:
   receiving a redirected access over the network from a user device at a central server;
   receiving an identification of a network device from which the user device was redirected;
   providing a download file including the software and an acquisition code, wherein the acquisition code corresponds to the identification of the network device from which the user device was redirected;
   transmitting the download file including the software and the acquisition code over the network to the user device;

receiving an installation message over the network from the user device wherein the installation message indicates installation of the software at the user device;

after receiving the installation message from the user device, creating an installation code that is a unique installation of the software at the user device;

transmitting the installation code to the user device;

storing the installation code at the central server;

after storing the installation code, receiving registration information and the installation code over the network from the user device;

receiving a request by the server from the user device to print at least one digital image from the user device: and printing the at least one digital image.

2. The method according to claim 1 further comprising:

Presenting a download page to the user device over the network; and

Linking a download button of the download page to the download file including the software and the acquisition code.

3. The method according to claim 2 further comprising:

receiving a download request from the user device using the download button of the download page over the network, wherein transmitting the download file comprises transmitting the download file responsive to receiving the download request.

4. The method according to claim 1 wherein providing the download file comprises selecting the download file including the acquisition code and the software from a plurality of download files including the software and respective different acquisition codes.

5. The method according to claim 1 wherein providing the download file comprises creating the download file including the acquisition code and the software responsive to receiving the identification of the network device from which the user device was redirected.

6. The method according to claim 1 wherein receiving the identification of the network device includes extracting the identification of the network device from a uniform resource locater (URL) for the redirected access.

7. The method according to claim 1 wherein the software supports editing and organizing digital image files at the user device.

8. The method according to claim 1 wherein the software supports sharing of digital image files at the user device over the network.

9. The method according to claim 1 further comprising:

coordinating sharing of files at the user device over the network.

10. A computer program product for providing software over a network, the computer program product comprising a computer readable medium having a computer readable program code embodied therein, when executed, causes a computer to perform the following:

receive a redirected access over the network from a user device at a central server;

receive an identification of a network device from which the user device was redirected;

provide a download file including the software and an acquisition code, wherein the acquisition code corresponds to the identification of the network device from which the user device was redirected;

transmit the download file including the software and the acquisition code over the network to the user device;

receive an installation message over the network from the user device wherein the installation message indicates installation of the software at the user device;

create an installation code that is a unique installation of the software at the user device after receiving the installation message from the user device;

transmit the installation code to the user device;

store the installation code at the central server;

receive registration information and the installation code over the network from the user device after storing the installation code;

receive a request by the server from the user device to print at least one digital image from the user device; and print the at least one digital image.

11. The computer program product according to claim 10, wherein when executed, causes a computer to further perform the following:

present a download page to the user device over the network; and link a download button of the download page to the download file including the software and the acquisition code.

12. The computer program product according to claim 11, wherein when executed, causes a computer to further perform the following:

receive a download request from the user device using the download button of the download page over the network, wherein transmitting the download file comprises transmitting the download file responsive to receiving the download request.

13. The computer program product according to claim 10 wherein providing the download file comprises selecting the download file including the acquisition code and the software from a plurality of download files including the software and respective different acquisition codes.

14. The computer program product according to claim 10 wherein providing the download file comprises creating the download file including the acquisition code and the software responsive to receiving the identification of the network device from which the user device was redirected.

15. The computer program product according to claim 10 wherein receiving the identification of the network device includes extracting the identification of the network device from a uniform resource locater (URL) for the redirected access.

16. The computer program product according to claim 10 wherein the software supports editing and organizing digital image files at the user device.

17. The computer program product according to claim 10 wherein the software supports sharing of digital image files at the user device over the network.

* * * * *